United States Patent [19]

Kusumoto et al.

[11] Patent Number: 5,233,255

[45] Date of Patent: Aug. 3, 1993

[54] AC GENERATOR FOR VEHICLES

[75] Inventors: Katsuhiko Kusumoto; Toshinori Tanaka, both of Hyogo, Japan

[73] Assignee: Mitsubishi Denki K.K., Tokyo, Japan

[21] Appl. No.: 914,525

[22] Filed: Jul. 17, 1992

[30] Foreign Application Priority Data

Jul. 19, 1991 [JP] Japan ............................ 3-064599[U]

[51] Int. Cl.$^5$ ............................................ H02K 1/22
[52] U.S. Cl. ..................................... 310/263; 310/179
[58] Field of Search ............ 310/263, 40 R, 40 MM, 310/58, 154, 156, 179, 180, 261

[56] References Cited

U.S. PATENT DOCUMENTS

| | | | |
|---|---|---|---|
| 3,450,913 | 6/1969 | Baker et al. | 310/263 |
| 4,418,295 | 11/1983 | Shiga | 310/59 |
| 4,492,885 | 1/1985 | Kitamura et al. | 310/51 |
| 4,980,595 | 12/1990 | Arora | 310/263 |
| 5,028,826 | 7/1991 | Kitamura | 310/62 |
| 5,132,581 | 7/1992 | Kusase | 310/263 |

Primary Examiner—Steven L. Stephan
Assistant Examiner—Matthew Nguyen
Attorney, Agent, or Firm—Sughrue, Mion, Zinn, Macpeak & Seas

[57] ABSTRACT

The present invention of an AC generator for use in a vehicle in which front and rear brackets hold a stator there-between and support rotatably a rotor theirbetween inside the stator. A pair of magnetic pole cores mounted on the rotor has end surfaces and holds an exciting coil theirbetween. Two fans are mounted on the end surfaces, respectively, so as to produce cooling blow. wherein said magnetic pole cores are formed such that a height in a circumference direction thereof is greater than a length between said two surfaces to thereby increase an area thereof to be in contact with said exciting coil, so that the transfer and diffusion of the heat of the exciting coil to the magnetic pole can be performed.

2 Claims, 1 Drawing Sheet

AC GENERATOR FOR VEHICLES

BACKGROUND OF THE INVENTION

The present invention relates to an AC generator for use in a vehicle in which ventilation and cooling can be achieved by use of a fan of a bracket support type rotor and, in particular, to the cooling of an exciting coil included in the rotor.

In FIG. 2, there is shown a sectional view of a conventional AC generator for use in a vehicle. In this figure, a stator 1 includes a stator core 2 and a stator coil 3. A rotor 4 is constructed in the following manner: heteropolar magnetic pole cores 5 and 6 are formed such that their respective magnetic pole pieces are projected alternately along the circumference of the rotor 4. The magnetic pole cores 5, 6 are also formed in such a manner that, when the axial length thereof is expressed as L and the height thereof is expressed as H, each of them has a relation of L >H. An exciting coil 7 is held between the two magnetic pole cores 5 and 6. A rotary shaft 8 connects fixedly the cores 5 and 6. A pair of slip rings 9 are fixed through respective insulation sleeves to the rotary shaft 8. Fans 10 and 11 are fixed to the magnetic pole cores 5 and 6, respectively.

Front and rear brackets 12 and 13 are fixed to the stator core 2 by means of a fastening bolt 14. The front bracket 12 includes a plurality of air suction holes 12a and a plurality of air exhaust holes 12b which are used for ventilation. Also, the rear bracket 13 similarly includes a plurality of air suction holes 13a and a plurality of air exhaust holes 13b respectively used for ventilation. The rotary shaft 8 is supported through bearings 15 and 16 by the front bracket 12 and rear bracket 13. A pulley 17 is fixed to the rotary shaft 8. When the rotation of an engine is transmitted thereto, then the pulley 17 rotates the rotary shaft 8.

A changes 18 rectifies an alternating current, which is generated due to an alternating voltage induced in the stator coil 3, to a direct current. A voltage regulator 19 detects a generator voltage and controls an exciting current so as to adjust a terminal voltage to a predetermined value. A brush holder 20 is used to hold a brush 21 and presses the brush 21 against the slip rings 9.

In the above AC generator, if the rotor 4 is rotated, then an alternating voltage is induced in the stator coil 3 and electric power is supplied, with the additional result that heat is generated. The, stator 1 and rotor 4 are cooled by means of ventilation caused by rotation of the fans 10 and 11.

The cooling air produced by means of the rotation of the fan 10, as shown by arrows in FIG. 2, is sucked in through the suction holes 12a in the front bracket 12, and is then discharged from the exhaust holes 12b so as to cool the magnetic pole core 5 and stator 1. The cooling air produced by the rotation of the fan 11, as shown by other arrows in FIG. 2, is sucked in through the suction holes 13a in the bracket 13, and is discharged from the exhaust holes 13b so as to cool the rectifier 18, voltage regulator 19, electricity collector (not shown) magnetic pole core 6, and stator 1.

As described above, in the conventional AC generator in a vehicle, the magnetic pole cores 5 and 6 are formed such that each of them has a relation of L >H where L expresses the length thereof and H expresses the height thereof. As a result, the magnetic pole cores 5 and 6 have a limited heat transfer surface area in contact with the exciting coil 7. Therefore, the rotor 4 is incapable of efficiently transferring and diffusing heat from the exciting coil 7 to the magnetic pole cores 5 and 6, and the exciting coil 7 exhibits a high rate of temperature increase. Accordingly, the exciting coil 7 and suffers from such drawbacks as decreased life and reduced magnetomotive force, due to an increase of its electrical resistance

SUMMARY OF THE INVENTION

Accordingly, an object of this invention is to eliminate the above-described problems in the conventional AC generator.

More specifically, an object of the invention is to provide an AC generator for use in a vehicle which can reduce rate of temperature increase of an exciting coil held by and between magnetic pole cores, so as to extend the life of the exciting coil, and to prevent a decrease in its magnetomotive force caused by an increase in its electrical resistance.

In order to attain the above object, according to the invention, there is provided an generator for use in a vehicle in which each of the magnetic pole cores of a rotor is formed such that the height of the rotor to its outer periphery, is greater than the length of both cores along the axis of the rotor, such that each of the magnetic pole cores has a large area in contact with an exciting coil.

According to the invention, because the exciting coil is in contact with the magnetic pole cores over a sufficiently large area, the efficiency in transferring and diffusing heat from the exciting coil to the magnetic pole cores is improved, and a high rate of temperature increases of the exciting coil can be prevented.

DETAILED DESCRIPTION OF THE DRAWINGS

DETAILED DESCRIPTION OF THE EMBODIMENT OF THE INVENTION

Figure 1:
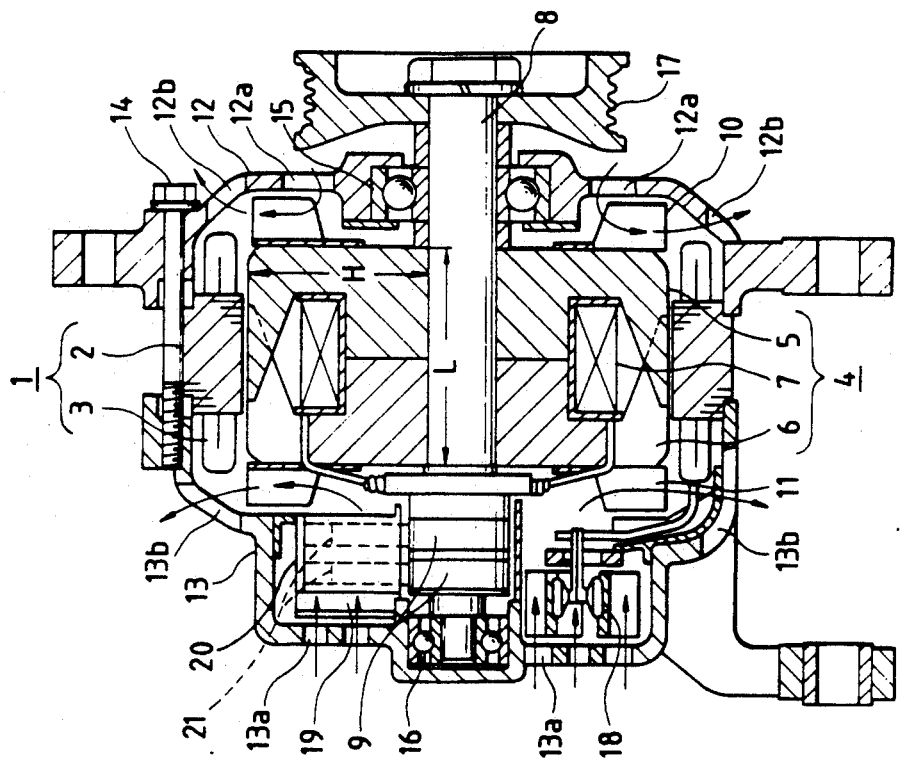
FIG. 1 is a sectional view of an embodiment of an AC generator according to the present invention.
Figure 2:
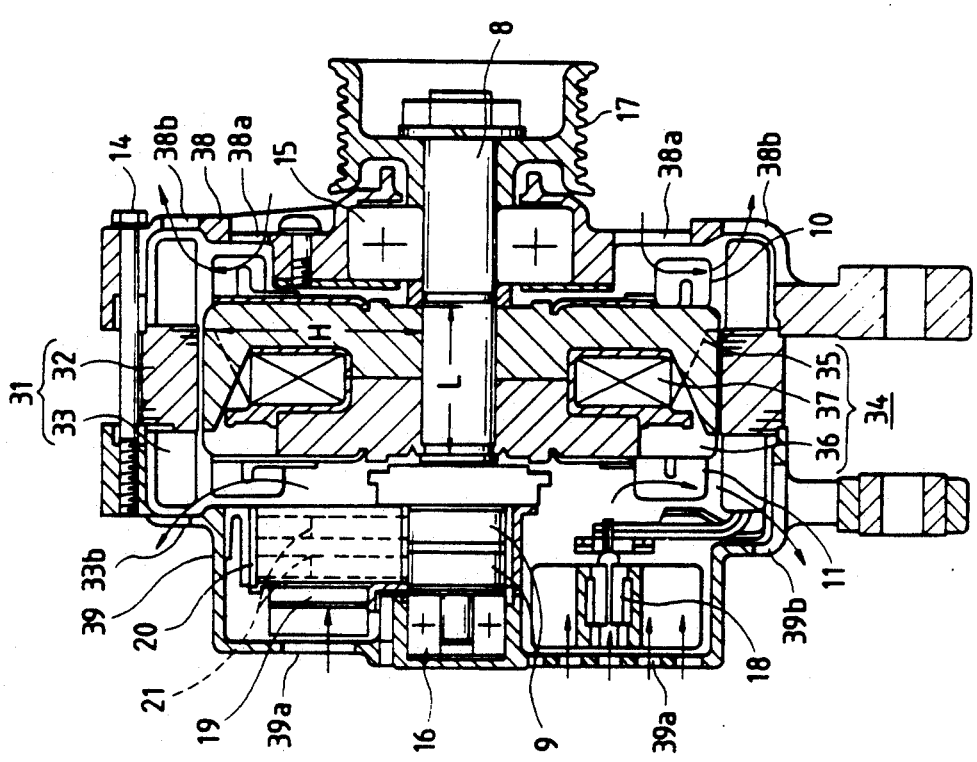
FIG. 2 is a sectional view of a conventional AC generator.

FIG. 1 is a sectional view of an embodiment of an AC generator for use in a vehicle according to the invention. In FIG. 1, a rotary shaft 8, a slip rings 9, fans 10 and 11, front and rear brackets 12 and 13, holes 12a, 12b, 13a and 13b, fastening bolt 14, bearings 15 and 16, a pulley 17, a rectifier 18, a voltage regulator 19, a brush holder 20 and brush 21 are used to designate the same parts as shown in FIG. 2. A stator 31 is composed of a stator core 32 and a stator coil 33. A rotor 34 is constructed in the following manner: heterpolar magnetic pole cores 35 and 36 are formed in such a manner that the their respective magnetic pole pieces are projected alternately along the circumference of the rotor 34. With respect to the relationship between the length L of the magnetic pole cores 35 and 36 along the axis of the rotor 34 and the height H in a measured from the inner periphery of one of the pole cores where it contacts rotary shaft 8 to its outer periphery, the magnetic pole cores 35 and 36 are formed such that the height H is greater than the length L, that is, $L < H$. the magnetic cores 35 and 36 are fixed to the rotary shaft 8, to which are also fixed a pair of slip rings 9 through insulation sleeves, respectively.

Front and rear brackets 38 and 39 are connected to the stator core 31 by use of the fastening bolt 14. In the front bracket 38, there are formed a plurality of air suction holes 38a and a plurality of air exhaust holes 38b for ventilation. Similarly, in the rear bracket 39, there are formed a plurality of air suction holes 39a and a plurality of air exhaust holes 39b for ventilation.

Each of the magnetic pole cores 35 and 36 is formed such that its height, measured from its inner periphery to its outer periphery, is greater than the length along the axis of the rotor 34 of both magnetic pole cores. Due to this, an exciting coil 37 can be contacted with and held by the magnetic pole cores 35 and 36 over a larger surface area than the above-mentioned conventional AC generator. When the rotor 34 is rotated, the cooling air that is produced by the fans 10 and 11 is allowed to circulate within the AC generator in such a way as shown by arrows in FIG. 1, thereby cooling the magnetic cores 35 and 36. In other words, since the exciting coil 37 is over contact with the magnetic pole cores 35 and 36 in a larger surface area, the heat that builds up in the exciting coil 37 can be transferred and diffused to the magnetic pole cores 35 and 36 more effectively, and the heat of the magnetic pole cores 35 and 36 can then be diffused by the cooling air. As the result, a rate of temperature increase of the exciting coil 37 is as compared with that of the conventional AC generator. Accordingly, an increase in the electrical resistance of the exciting coil 37 can be prevented, and the consequential reduction of the magnetomotive force of the exciting coil when it is heated can be prevented, thereby allowing the exciting coil 37 to perform its given function.

As was described above, according to the present invention, because each of the magnetic pole cores of the rotor is formed such that the height of one pole core is greater than the length of both pole cores to thereby increase the surface area of the cores in contact with the exciting coil, the transfer and diffusion of the heat of the exciting coil to the magnetic pole cores can be improved, the rate of temperature increase of the exciting coil can be reduced, the life of the exciting coil can be extended, and the reduction of the magnetomotive force of the exciting coil due to the increase in the electrical resistance of the exciting coil can be prevented. Additionally, the length of the exciting coil along the axis of the rotor can be decreased.

What is claimed is:

1. An AC generator for use in a vehicle comprising:

a stator constructed in the shape of a ring;

front and rear brackets holding said stator therebetween as a cylindrical case;

a rotor being rotatably supported between said front and rear brackets in said case said rotor further comprising: a pair of magnetic pole cores mounted on a rotary shaft and positioned inside said stator, said pair of magnetic pole cores having end surfaces facing toward an axial direction of said rotor; and an exciting coil secured between said magnetic pole cores; and two fans mounted on said end surfaces of said magnetic pole cores, respectively, so as to produce cooling air;

wherein said magnetic pole cores are formed such that a height of said magnetic pole cores measured from an inner periphery of one of said magnetic pole cores, said inner periphery in contact with said rotary shaft, to an outer periphery of said one of said magnetic pole cores is grater than a length of both of said magnetic pole cores along the axis of the rotor, to thereby increase a conductive heat transfer surface area thereof in contact with said exciting coil, and wherein heat generated by said exciting coil is conducted away from said exciting coil by said magnetic pole cores across said conductive heat transfer surface area.

2. An AC generator for use in a vehicle according to claim 1, wherein both of said front and rear brackets are provided with a plurality of air suction holes and a plurality of air exhaust holes for ventilation.

* * * * *